Patented June 17, 1952

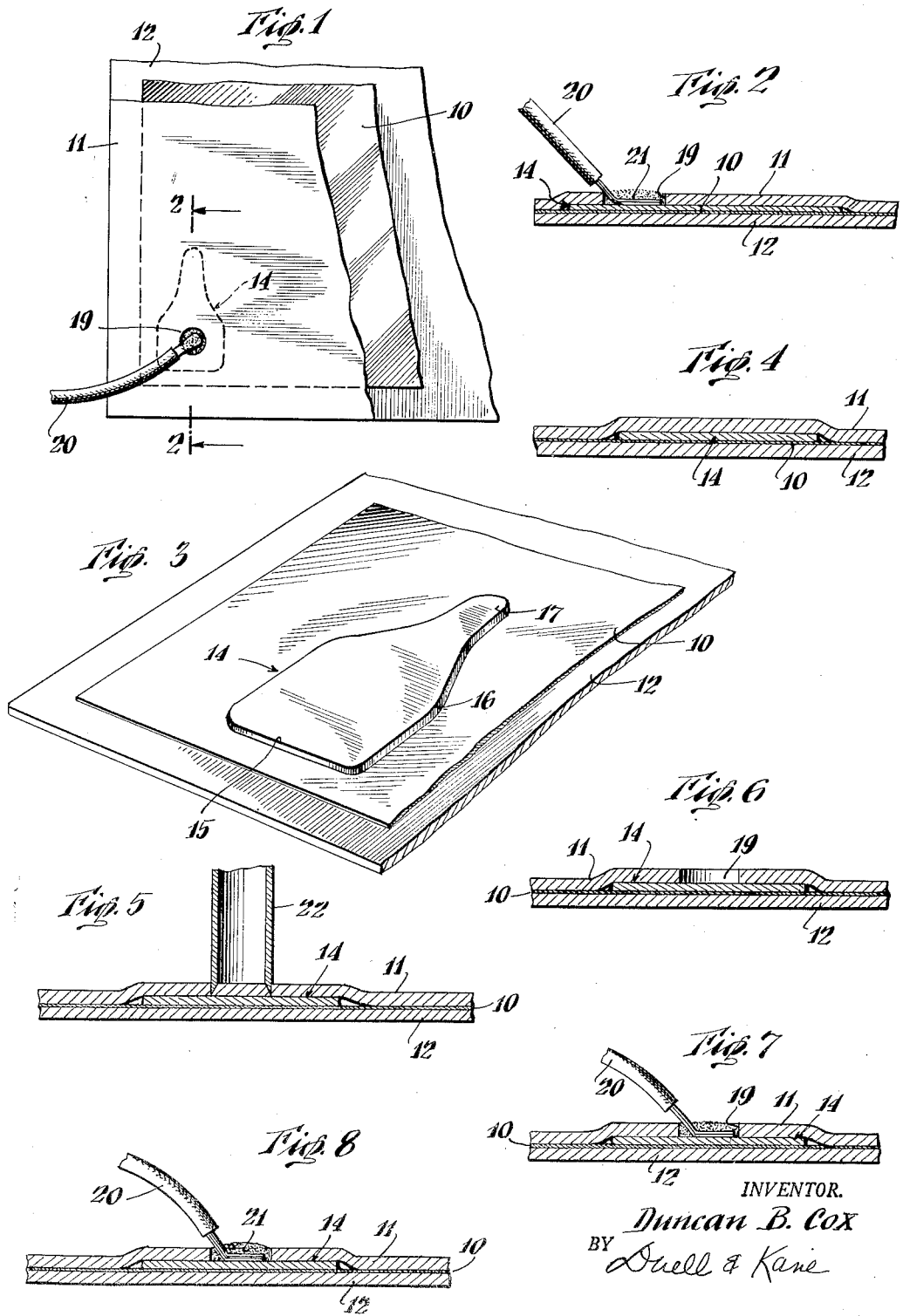

2,600,485

UNITED STATES PATENT OFFICE 2,600,485

METAL FOIL HEATING DEVICE

Duncan B. Cox, Woodbury, N. Y.

Application September 16, 1950, Serial No. 185,289

6 Claims. (Cl. 219—19)

This invention relates to an improved metal foil heating device and particularly to a heating device of this type having an improved electrical connector or connecting element for making electrical connection between the foil heating element and the electrical leads.

This application is a continuation in part of my patent application Serial No. 687,756 for Electric Heater filed on August 1, 1946, which application has now become abandoned.

It has been heretofore proposed to provide electric heating devices having heating elements made from thin metal foil. Such elements have the advantage of being relatively simple and inexpensive to manufacture and install and of being efficient and safe in operation and use. However, it is difficult to make satisfactory electrical connections with the foil heating elements.

The prime object of the present invention is to overcome the difficulty heretofore encountered in making such electrical connections to foil heating elements and to provide a foil heating element having an improved electrical connector or connecting element which is relatively simple to manufacture and assemble with the foil heating element, to which electrical leads may be readily connected and which will give satisfactory service over a long period of time.

A further object is the provision of an improved method of assembling the electrical connecting element with the heating element.

In the accompanying drawing—

Fig. 1 is a partially fragmentary plan view of a small portion of a heating device embodying my invention;

Fig. 2 is a sectional view on the line 2—2 of Fig. 1;

Fig. 3 is a perspective view of the first step in assembling the electrical connector with the foil heating element; and Figs. 4-8 are sectional views of the succeeding steps in completing the assembly.

My invention is applicable to any type of electrical heating device having a foil heating element particularly a foil heating element less than .002" in thickness. In the accompanying drawing I have illustrated my invention as applied to a heating device consisting of a foil heating element 10 having flexible sheets 11 and 12 formed of insulating material laminated over the two surfaces thereof.

The foil may be made from any suitable metal or alloy which can be formed into foil less than .002" in thickness and which can serve as an electric heating element as, for instance, lead, tin, zinc, Monel, aluminum, stainless steel, nickel, brass, etc. For this purpose I prefer to use a thin foil less than .002" and preferably around .0007" in thickness made from lead or an alloy of lead with 1 to 4% antimony, or an alloy of lead having 1 to 4% tin or tin and antimony or a foil made of lead or the indicated lead alloy having a very thin coating of tin. Foil made from the preferred metal or alloys has a melting point which is high enough to make a practical heating element while at the same time it is low enough to provide the advantages of safety and automatic fusing if excessive temperatures are reached. Also, a foil made from lead or the indicated alloys has a relatively high resistance so that the desired resistance and heat output can be obtained while, at the same time, using a relatively wide foil path for a feasible foil thickness.

The insulating sheets 11 and 12 are made from suitable flexible insulating material such as cellulose or asbestos paper, fabric, or woven or felted glass fibre. However, under certain circumstances a rigid insulating panel such as a pressed wood or a molded panel or the like may be employed.

The foil is laminated to the insulating sheets by a suitable adhesive such as casein or silicone adhesives, as may be required to withstand the operating temperatures and other conditions without adverse effect and which will not affect or interfere with the conducting or resistance characteristics of the unit.

The heating element may be of any desired configuration and the particular configuration forms no part of my present invention. My invention is concerned with the electrical connection between the foil heating element and the electrical leads. It will be appreciated that making a direct electrical connection of a permanent character between a wire lead and thin metal foil presents difficulty. I have found that it is desirable to reinforce the foil or increase the thickness thereof throughout the area where the electrical connection is to be made and for this purpose I use a relatively stronger or thicker strip of metal which is connected to the foil and to which the wire leads may be readily soldered or otherwise connected. I have found that under most circumstances it is preferable that the strip of metal be flexible so as to minimize the danger of breakage or ruptures along the edges thereof. I have also found that it is desirable that the strip be provided with edges which are curved, preferably with reverse or ogee curves to prevent the formation of crease lines which tend to break the foil along the edge of the strip. It is also desirable that the strip be made from a metal having relatively high conductivity and melting point.

A preferred form of electrical connector embodying my invention is shown at 14 in the accompanying drawing and it consists of an elongated, tapered strip or tab formed of copper or a copper alloy such as brass or phosphorus bronze or other metal or metal alloy which is available economically in sheet or strip form and to which the foil and lead wires may be readily soldered, between .0005" and .005" in thickness. It will be seen that the tab is formed with a relatively blunt end portion 15 having rounded corners, longitudinal edges 16 formed in reverse or ogee curves, and which terminates in one or more rounded prongs 17. The connector is normally tinned and then joined over its entire surface by fusing to the foil element through the use of a flux and the application of heat and pressure. The prong end or tip of the connector should preferably point in the direction of current flow, two prongs being used if the current flows in parallel in two directions from a given connector. For extremely high current densities, more than one prong in the direction of current flow may be desirable. This construction provides a long line of contact between the connector and the foil for the passage of the current. Thus, even if the electrical connection is not properly made, or is broken along a considerable portion of the edge of the connector, a sufficient line of contact remains to provide a satisfactory electrical connection between the connector and the element. A sound electrical connection between the connector and the lead-in wire can readily be accomplished by soldering or otherwise.

There is a further advantage in my special shape of connector with its relatively long and thin prong or tip, as shown in the drawing. When soldering the lead wire to the center of the body of the connector, the heat is dissipated as it flows out to the tip and thus accidental fusing of the foil along the line of contact with the connector around the tip thereof is avoided.

The outer sheet of insulating material 11 is provided with an aperture 19 in registry with the enlarged body portion of the connector as shown in Fig. 1. The surface of the connector is thus accessible from the exterior of the heating device and a lead wire 20 may be readily soldered to the connector as indicated at 21.

My improved electrical connector may be assembled with the heating device as shown in Figs. 3 to 8. Thus, the connector 14 may be first placed upon the foil element 16 after the insulating sheet 12 has been laminated thereto but prior to the application of insulating sheet 11. It is arranged as shown with the prong portion 17 pointing inwardly away from the end of the foil element strip. The connector is then secured to the foil over its entire area with heat and pressure, a suitable flux being preferably used. Thereafter, the outer sheet 11 of insulating material is normally laminated over the foil element and over the connector 14 providing an insulating sheathing around the entire heating device. It is then necessary to provide an aperture in registry with the main body portion of the connector 14 and this may be accomplished by means of a conventional paper drill 22 as shown in Fig. 5. The drill is used in the usual manner to cut a circular plug of the insulating material at the proper point in registry with the body portion of the connector. Care must be taken not to drill so deep as to cut or damage the connector. The plug of insulation material is then removed with a knife or similar instrument.

The hole through the insulating sheet is preferably made less than one half the area of the connector and located over a central portion thereof so that the connector is supported on all sides by the insulating sheet through which the hole has been cut as well as being supported by reason of its attachment through the element to the other insulated sheet. An electrical lead wire soldered to the connector is thus attached to the center of a well supported area. Any stress applied to the lead wire is transferred directly to the insulated coverings and does not tend to rupture the electrical connection between the connector and the element. I have found that lead wires thus connected to elements of the preferred type, as hereinbefore described, readily withstand a tension of 10 pounds in any direction, even if the insulating material in which the hole is cut is composed of ordinary paper, whereas a lead wire soldered directly to the element can be pulled off with a force of less than one ounce.

The heating device with the aperture 19 cut in one of the sheets of insulating material 11 over a central part of the connector 14 is shown in Fig. 6. Thereafter as shown in Fig. 7, the end of the wire lead 20 may be inserted in the aperture 19 and the wire placed in contact with the connector 14. It can be suitably secured in position in any desired manner as by means of soldering 21 as shown in Fig. 8.

It will be appreciated that a heating device having a foil heating element should be assembled in the manner indicated herein with the connectors 14 properly positioned so that the lead wires can be connected to provide the proper electrical circuit. The electrical connectors are of such a character that no special skill or training is required in making the electrical connection to the completed heater, and electricians and electric contractors may readily make the connections on the job or at the point of installation.

From the foregoing, it will be seen that I have provided an improved electrical heating device having a metal foil element with an improved electrical connector whereby electrical connection may be readily made to the foil element. It will also be seen that the device is relatively simple to manufacture and assemble with the heating element, that electrical lead wires may be readily connected thereto and that it will give satisfactory service over a relatively long period of time with freedom from wear and tear. Modifications may, of course, be made in the illustrated and described embodiment of the invention without departing from the invention as set forth in the accompanying claims.

I claim:

1. An electric heating device comprising a heating element made of thin flexible metal foil, an electrical connecting element in the form of a relatively stronger strip of metal secured to the foil and electrically connected thereto and a pair of sheets of insulating material secured over the two surfaces of the foil and over the electrical connecting element, one of said insulating sheets being formed with an aperture in registry with the electrical connecting element so as to expose a portion of the surface thereof.

2. An electric heating device comprising a heating element formed of thin flexible foil less than .002" in thickness made of material selected from the group consisting of lead, lead alloys and tin coated lead and lead alloys, an electric connecting element in the form of a flexible strip between .0005" and .005" in thickness and made of a metal selected from the group consisting of copper and copper alloys said strip being provided with curved edges and a pair of flexible sheets of insulating material secured over the two surfaces of the foil and over the electrical connecting element one of said sheets being formed with an aperture in registry with said connecting element so as to expose a portion of the surface thereof.

3. An electric heating device comprising a heating element in the form of a sheet of conducting foil with insulating coverings on each side, and an electrical connector consisting of a piece of metal in sheet form electrically connected to said heating element, one of said coverings being provided with a hole exposing a portion of the surface of said electrical connector and an electrical connection through said hole between the said connector and an electric current source.

4. An electric heating device as described in claim 3 in which the hole exposes an area less than one half that of the connector without exposing an edge thereof.

5. An electric heating device comprising: a heating element made of thin flexible metal foil; and an electrical connecting element in the form of a tab made of a relatively stronger flexible metal strip having an elongated tapered section, said tab being secured and electrically connected to the foil with the prong projecting in the direction of the current path.

6. An electric heating device comprising: a heating element made of thin flexible metal foil; an electrical connecting element in the form of a tab made of a relatively stronger metal strip having an elongated tapered section, said tab being secured by soldering and electrically connected to the foil with the prong pointing in the direction of the current path; and a pair of flexible sheets of insulating material secured over the two surfaces of the foil and over the electrical connecting element, one of said insulating sheets being formed with an aperture in registry with the electrical connecting element so as to expose a portion of the surface thereof.

DUNCAN B. COX.

REFERENCES CITED

The following references are of record in the file of this patent:

UNITED STATES PATENTS

| Number | Name | Date |
| --- | --- | --- |
| 636,203 | Helberger | Oct. 31, 1889 |
| 1,298,396 | Pruessman | Mar. 25, 1919 |
| 1,334,142 | Dubilier | Mar. 16, 1920 |
| 1,657,249 | Eby | Jan. 24, 1928 |
| 1,719,298 | Knudsen | July 2, 1929 |
| 2,110,660 | Doczekal | Mar. 8, 1938 |
| 2,502,148 | Grothouse | Mar. 28, 1950 |
| 2,504,146 | Mossin | Apr. 18, 1950 |
| 2,540,295 | Schreiber | Feb. 6, 1951 |
| 2,544,547 | Vogel | Mar. 6, 1951 |

FOREIGN PATENTS

| Number | Country | Date |
| --- | --- | --- |
| 447,453 | Great Britain | May 19, 1936 |
| 550,433 | Great Britain | Jan. 7, 1943 |
| 628,275 | Great Britain | Aug. 25, 1949 |
| 77,262 | Germany | Sept. 25, 1894 |